(12) United States Patent
Nagoya

(10) Patent No.: US 6,281,982 B1
(45) Date of Patent: Aug. 28, 2001

(54) INFORMATION PROCESSING APPARATUS, INFORMATION PROCESSING METHOD, STORAGE MEDIUM, AND PRINTING SYSTEM

(75) Inventor: Kenji Nagoya, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/096,514

(22) Filed: Jun. 12, 1998

(30) Foreign Application Priority Data

Jun. 16, 1997 (JP) .................................................. 9-158697

(51) Int. Cl.⁷ .............................. B41J 15/00; B41B 15/00
(52) U.S. Cl. ...................... 358/1.18; 358/1.16; 358/1.17; 358/1.11; 358/1.9; 345/153; 345/154; 345/155
(58) Field of Search .................... 358/1.16, 1.17, 358/1.18, 1.15, 1.11, 1.9; 345/153–155; 364/468.01, 468.04

(56) References Cited

U.S. PATENT DOCUMENTS 5,379,376 * 1/1995 Bednowitz .......................... 345/501
5,566,287 * 10/1996 Delpuch ............................. 345/433

\* cited by examiner

Primary Examiner—Edward Coles
Assistant Examiner—Twyler Lamb
(74) Attorney, Agent, or Firm—Fitzpatrick, Cella, Harper & Scinto

(57) ABSTRACT

An information processor which generates drawing output commands includes a judgment unit which judges whether or not the drawing area of an input drawing command from an input unit overlaps with the drawing area of another drawing command. Drawing attributes of the input drawing command are changed in the event the judged areas are not overlapping, and are not changed in the event that the judged areas are overlapping.

26 Claims, 15 Drawing Sheets

| NO. 0 | INFORMATION FOR AREA NO. 0 |
| NO. 1 | INFORMATION FOR AREA NO. 1 |
| ..... | ..... |
| NO. k | INFORMATION FOR AREA NO. k |
| ..... | ..... |

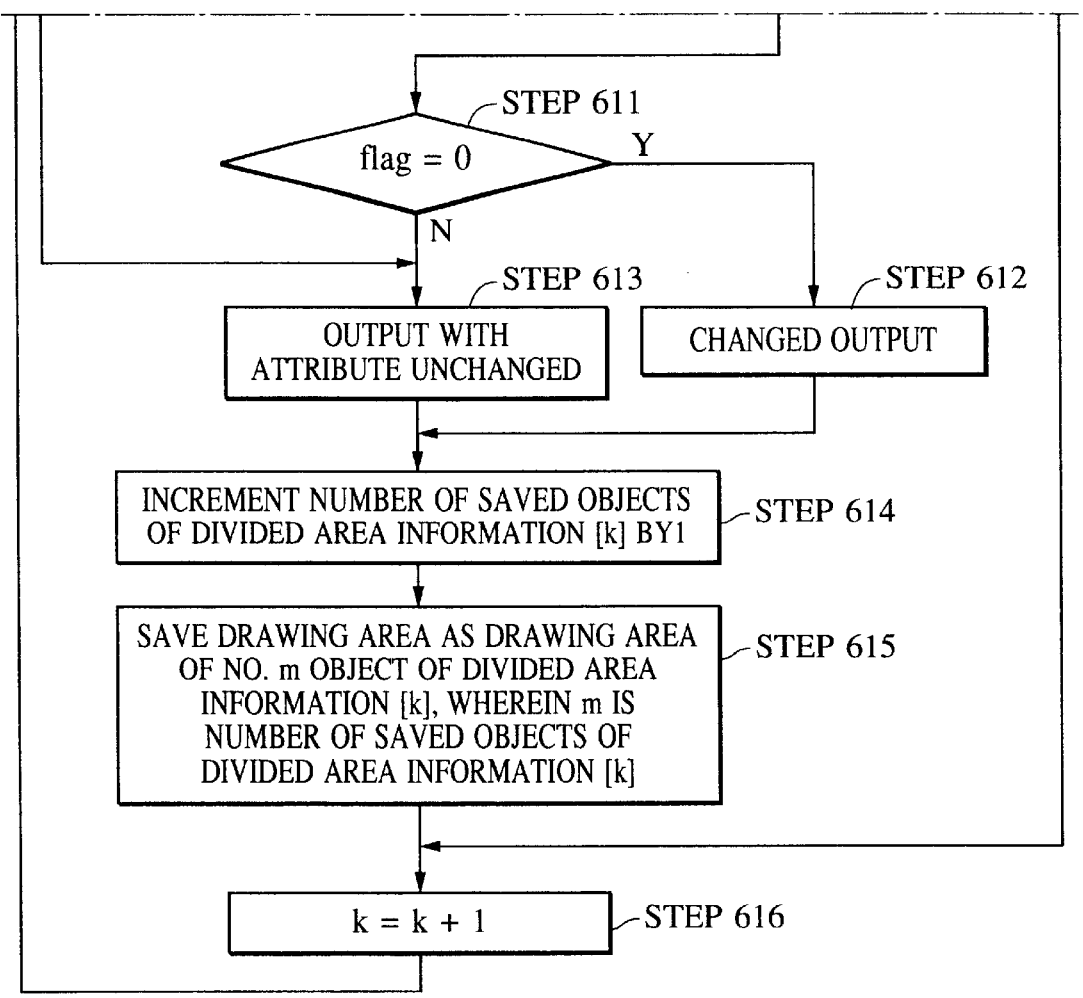

FIG. 12

| FIRST DIVIDED AREA INFORMATION |
|---|
| SECOND DIVIDED AREA INFORMATION |
| THIRD DIVIDED AREA INFORMATION |
| . . . . . . . |

INFORMATION PROCESSING APPARATUS, INFORMATION PROCESSING METHOD, STORAGE MEDIUM, AND PRINTING SYSTEM

BACKGROUND OF THE INVENTION

1. Field of the Invention

The preset invention relates to an information processing apparatus, an information processing method, a storage medium, and a printing system.

2. Description of the Related Art

Known drawing output generation has been performed by conducting logical drawing output processing dependent on the state of relevant areas such as with OR drawing or AND drawing, this processing being performed regardless of the contents of the relevant areas. The known art has thus had problems such as generation of defecting printing, increased output data amount accompanying switching of the logic drawing attributes, deterioration of printing throughput of the output device such as a printer, deterioration of reproducability of the output device such as a printer, and so forth.

As described above, known drawing output generation has been performed by conducting logical drawing output processing dependent on the state of relevant areas such as with OR drawing or AND drawing, this processing being performed regardless of the contents of the relevant areas. The known art has thus had problems such as generation of defecting printing, increased output data amount accompanying switching of the logic drawing attributes, deterioration of printing throughput of the output device such as a printer, deterioration of reproducability of the output device such as a printer, and so forth.

SUMMARY OF THE INVENTION

It is an object of the present invention to solve the above problems, i.e., to realize heretofore-unachieved reduction of generation of defective printing owing to a portion of a logic drawing being enabled, prevention of increased output data amount accompanying switching of the logic drawing attributes, and improved reproducability with the output device such as a printer.

It is another object of the present invention to improve processing speed in the case that the number of drawing requests becomes large.

It is yet another object of the present invention to simplify processing and improve processing speed.

It is a further object of the present invention to perform storage efficiently and improve processing speed.

In order to achieve the above objects, the information processing apparatus according to the present invention comprises: input means for inputting drawing commands; judging means for judging whether or not the drawing area of a drawing command input by the input means overlaps with the drawing area of another drawing command; and changing means for not changing the drawing attributes of the drawing command input by the input means in the event that the judging means judges that the areas are overlapping, and changing the drawing attributes of the drawing command input by the input means in the event that the areas are judged by the judging means to not be overlapping.

Also, the information processing method according to the present invention comprises the following steps: an input step of inputting drawing commands; a judging step of judging whether not the drawing area of a drawing command input in the input step overlaps with the drawing area of another drawing command; and a changing step of not changing the drawing attributes of the drawing command input in the input step in the event that the judging step judges that the areas are overlapping, and changing the drawing attributes of the drawing command input in the input step in the event that the areas are judged in the judging step to not be overlapping.

Also, the storage medium according to the present invention stores programs for executing the following steps: an input step of inputting drawing commands; a judging step of judging whether not the drawing area of a drawing command input in the input step overlaps with the drawing area of another drawing command; and a changing step of not changing the drawing attributes of the drawing command input in the input step in the event that the judging step judges that the areas are overlapping, and changing the drawing attributes of the drawing command input in the input step in the event that the areas are judged in the judging step to not be overlapping.

Further, the printing system according to the present invention, having a printer and an information processing apparatus, comprises: input means for inputting drawing commands; judging means for judging whether not the drawing area of a drawing command input by the input means overlaps with the drawing area of another drawing command; changing means for not changing the drawing attributes of the drawing command input by the input means in the event that the judging means judges that the areas are overlapping, and changing the drawing attributes of the drawing command input by the input means in the event that the areas are judged by the judging means to not be overlapping; and output means for outputting the drawing commands changed by the changing means to the printer.

BRIEF DESCRIPTION OF THE DRAWINGS

FIGS. 10A and 10B when taken together as shown in FIG. 10 form a flowchart describing the processing of Step 506 in FIG. 9 in detail;

FIG. 12 is a diagram illustrating the divided area information shown in FIG. 10 to be saved according to the number into which it is divided.

DESCRIPTION OF THE PREFERRED EMBODIMENT

Figure 1:
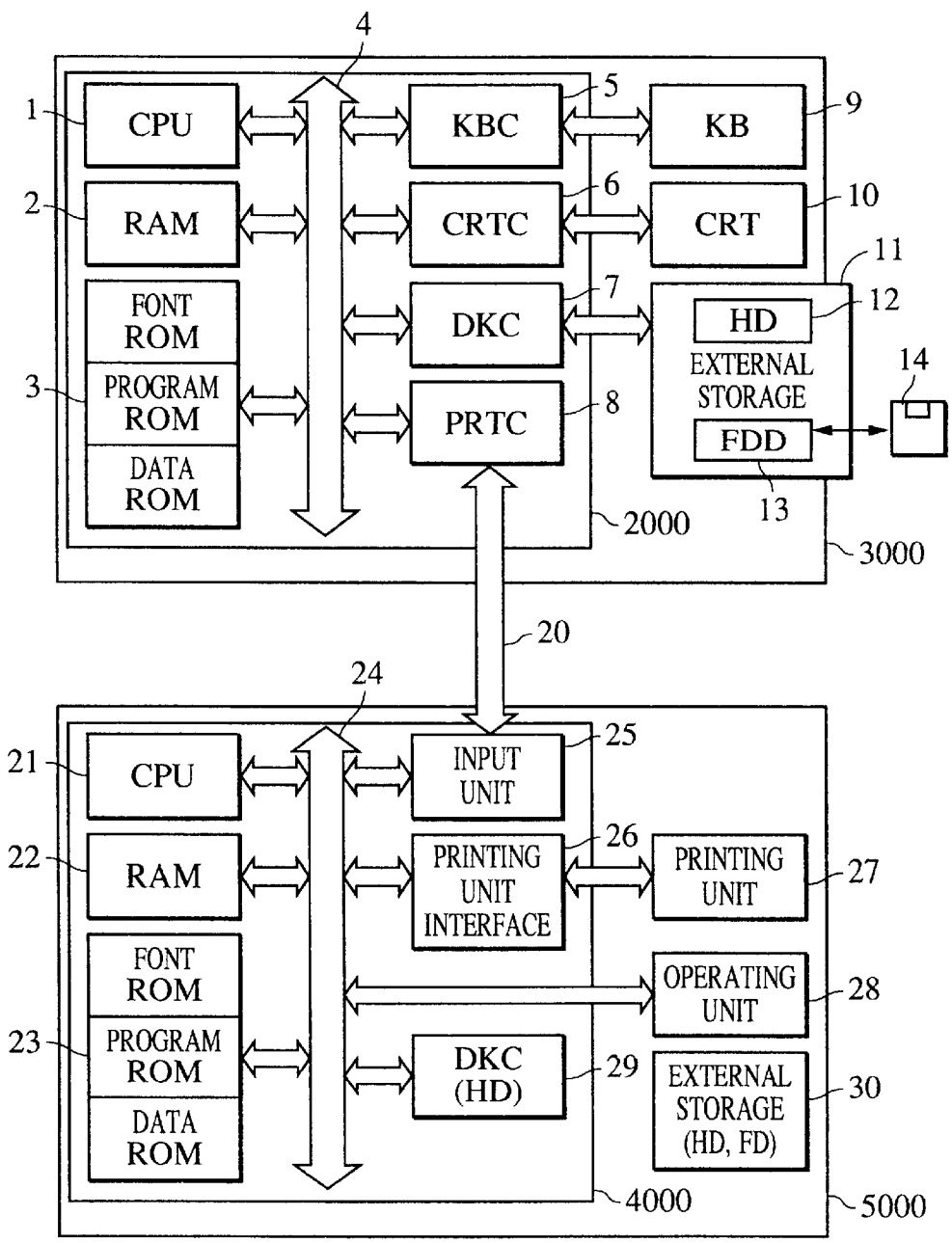
FIG. 1 is a block diagram illustrating an information processing apparatus exhibiting an embodiment of the present invention.

FIG. 1 is a block diagram illustrating an information processing apparatus exhibiting an embodiment of the present invention. Incidentally, it is needless to say that the present invention can be applied to any system so long as the functions of the present invention can be carried out, whether the system is comprised of a single piece of equipment, a plurality of pieces of equipment, or a system in which equipment is connected via a network such as a LAN or WAN to perform processing.

In FIG. 1, 3000 denotes a host computer which has a CPU 1 which executes document processing of documents which contain shapes, images, characters, tables (including spreadsheets and the like), etc., based on document processing programs or the like stored in program ROM in ROM 3. The CPU 1 performs general control of each of the devices connected to the system device 4.

Also, the program ROM of the ROM 3 or the external storage 11 stores an operating system program which is a program for controlling the CPU 1, font data or the like used for the above-mentioned document processing is stored in the program ROM of the ROM 3 or the external storage 11, and various types of data (such as directory information, printer driver table, etc.) used for the above-mentioned document processing is stored in the program ROM of the ROM 3 or the external storage 11. In this case, the main controlling component is the CPU 1, hardware-wise. On the other hand, software-wise, the main controlling component is the printing-related module including the logic drawing automation program. Reference numeral 2 denotes a RAM, which serves as main memory for the CPU 1, work area, and so forth. 5 denotes a keyboard controller (KBC), which controls key input from a keyboard 9 or an unshown pointing device. 6 denotes a CRT controller which controls the display of the CRT display (CRT) 10. 7 denotes a disk controller (DKC) which controls access with external storage 11 such as a hard disk 12 (HD), floppy disk 14 (FD) set in a floppy disk drive 13 (FDD), and so forth, the storage 11 storing various applications, font data, user files, editing files, logic drawing automation programs, and so forth. 8 denotes a printer controller (PRTC), which is connected with a printer 5000 via a certain interactive interface (interface) 20. The CPU 1 executes rendering of outline fonts (rasterizing) on the display information RAM set on the RAM 2, thus enabling WYSIWYG on the CRT 10. Also, the CPU 1 opens various types of windows registered based on commands instructed with an unshown mouse cursor on the CRT 10, and executes various types of data processing. Also, a window is displayed to set whether or not to change drawing commands, and the user is prompted to make a selection.

In the printer 5000, 21 denotes a printer CPU, which outputs image signals as output information to the printing unit (printer engine) 27 connected to the system bus 24 based on control programs or the like stored in the program ROM of the ROM 23 or based on control programs or the like stored in the external storage 30. Also, the program ROM of the ROM 23 stores control programs and the like for the CPU 21. The font ROM of the ROM 23 stores font data and the like to be used upon generating the above-described output information, and in the event that the printer is such that does not have external storage such as a hard disk, the data ROM sorts information and the like to be used on the host computer. The CPU 21 is capable of communication processing with the host computer via the input unit 25, the is configured so as to be capable of notifying the host computer 3000 of the information and the like in the printer. 22 is RAM which serves as main memory for the CPU 21, work area, etc., and is configured so that the memory capacity can be expanded by means of an optional RAM connected via an unshown extension port. The RAM 22 is used as an output information rendering area, environment data storage area, NVRAM, and so forth. The above-described externals storage 30 comprised of a hard disk (HD), IC card, etc., is connected optionally, and stores font data, emulation programs, form data, and the like. Also, 28 denotes the aforementioned operating panel and is provided with switches and LED indicators for operating.

Also, the above-described external storage is not restricted to a single item, but rather may be configured to connect a plurality of external storage devices, such as optional font cards in addition to native fonts, external storage devices storing programs for interpreting printer control languages for differing language systems, and so forth. Further, the configuration may have unshown NVRAM and store printer mode setting information from the operating panel 28.

Figure 2:
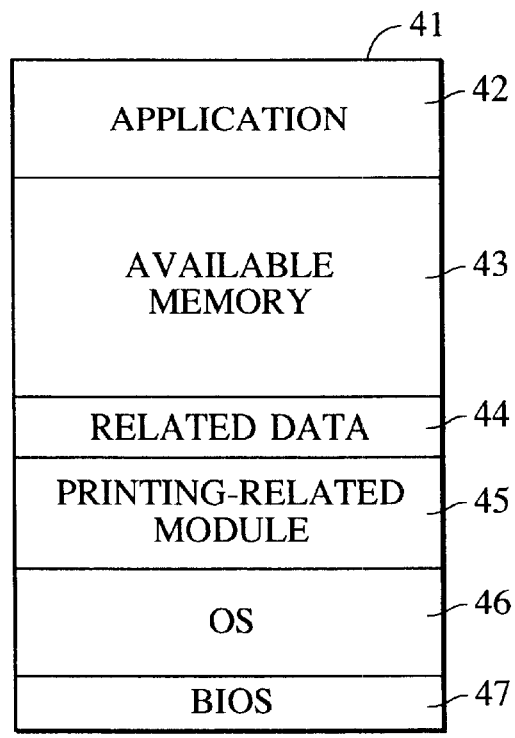
FIG. 2 is a memory map according to an embodiment of the present invention, wherein a printing-related module including a logic drawing automation program is loaded on the RAM 2 of the information processing apparatus 3000 and is in an executable state.

FIG. 2 illustrates a memory map wherein the control module is loaded on the RAM 2 based on administration of the operating system in the host computer 3000 and is in an executable state.

Figure 3:
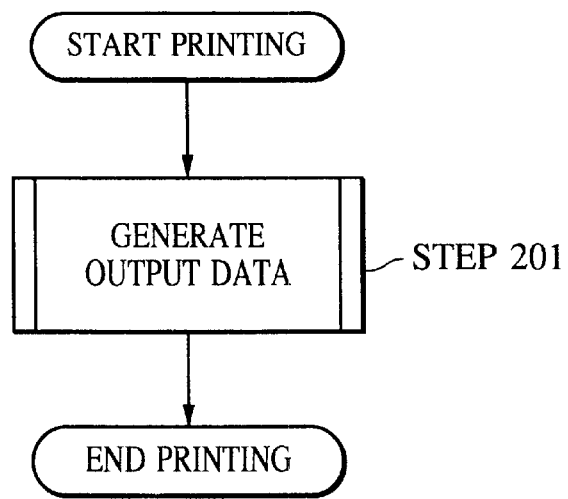
FIG. 3 is a flowchart schematically illustrating an embodiment of the present invention.

FIG. 3 is a flowchart schematically illustrating an embodiment of the present invention.

Figure 4:
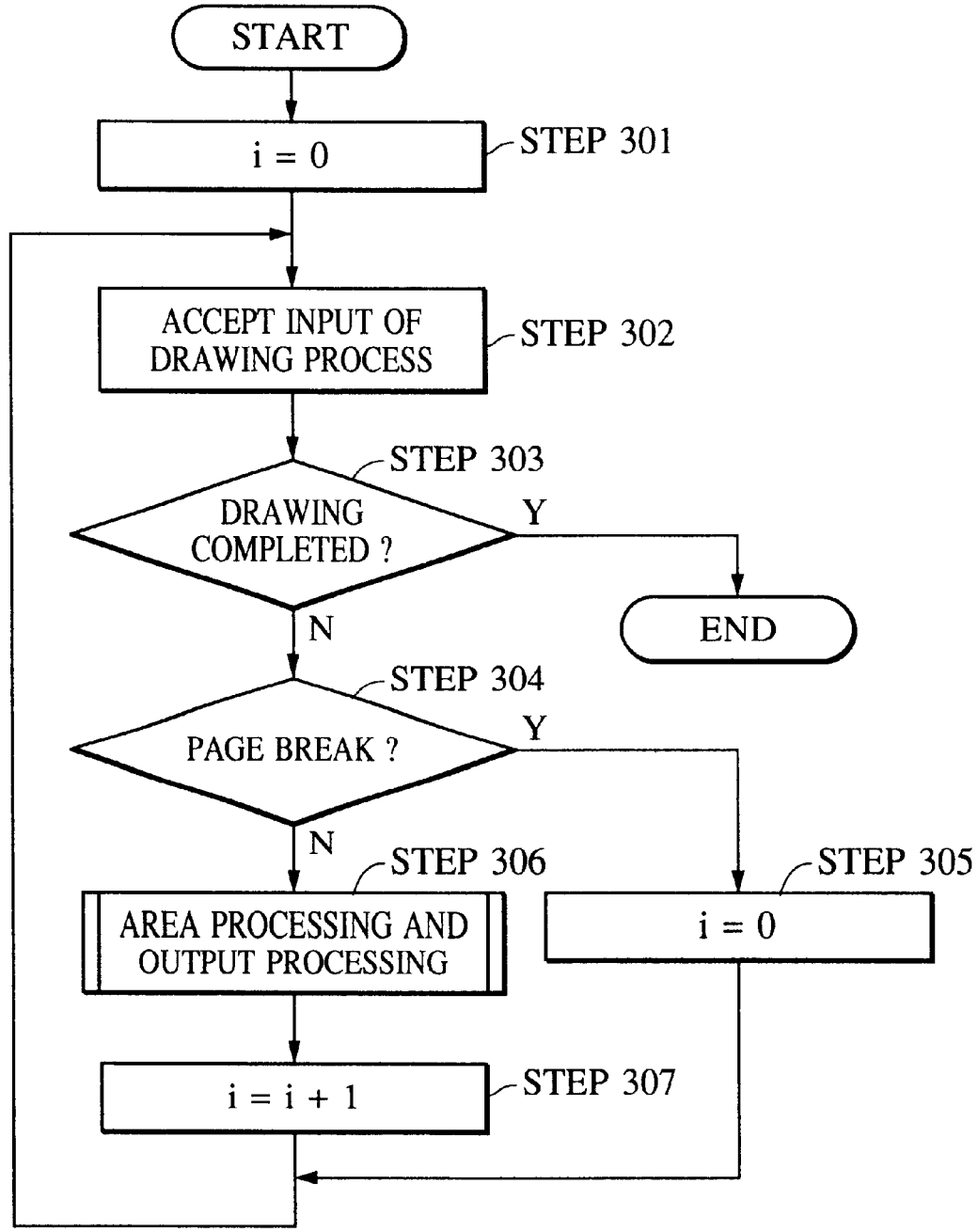
FIG. 4 is a flowchart describing the processing of Step 201 in FIG. 3 in detail.

FIG. 4 is a flowchart describing the processing of the output data generating step (Step 201) in FIG. 3 in detail.

Figure 5:
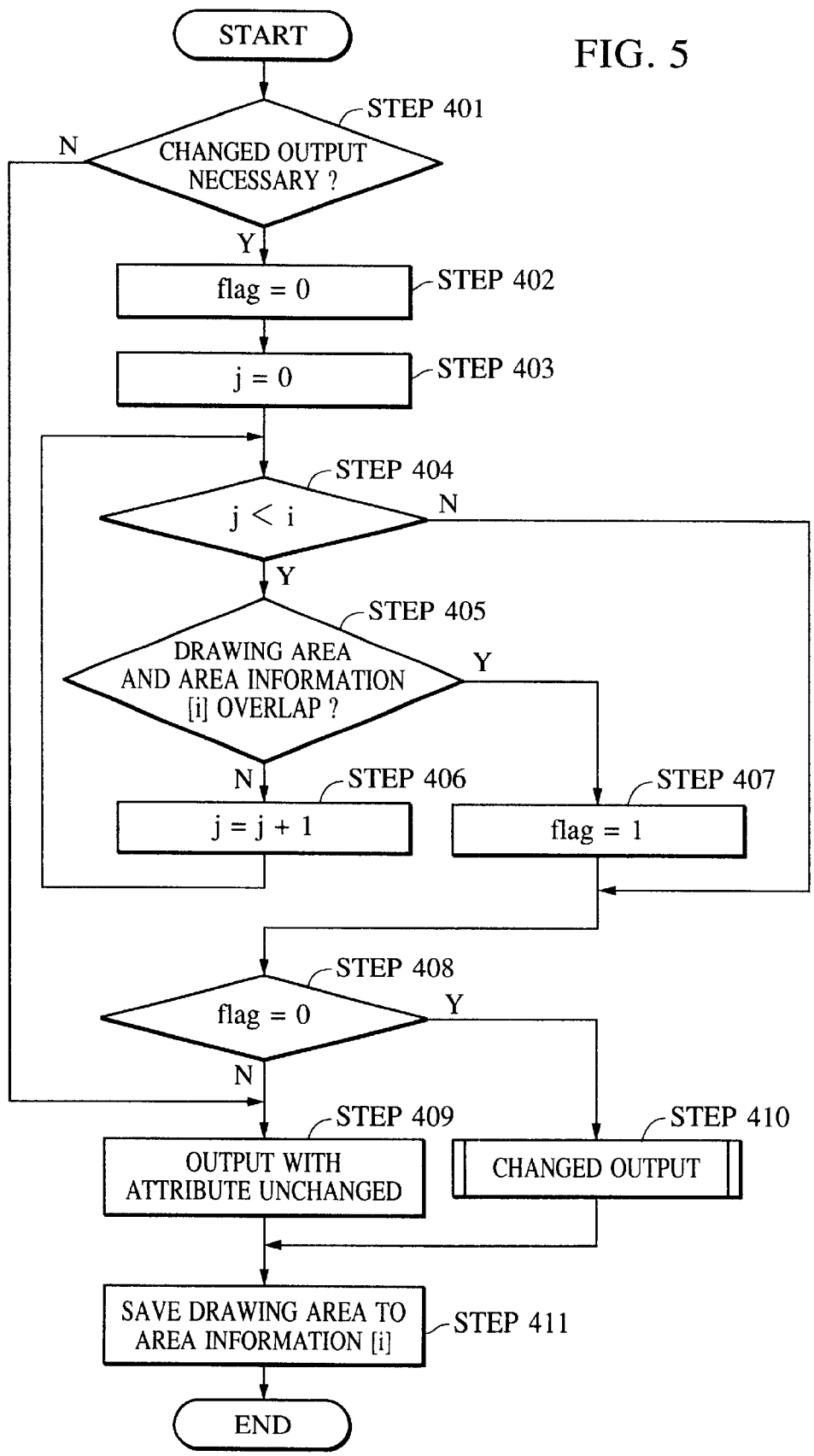
FIG. 5 is a flowchart describing the processing of Step 306 in FIG. 4 in detail.

FIG. 5 is a flowchart describing the processing of the area processing and output processing (Step 306) in FIG. 4 in detail.

Figure 6:
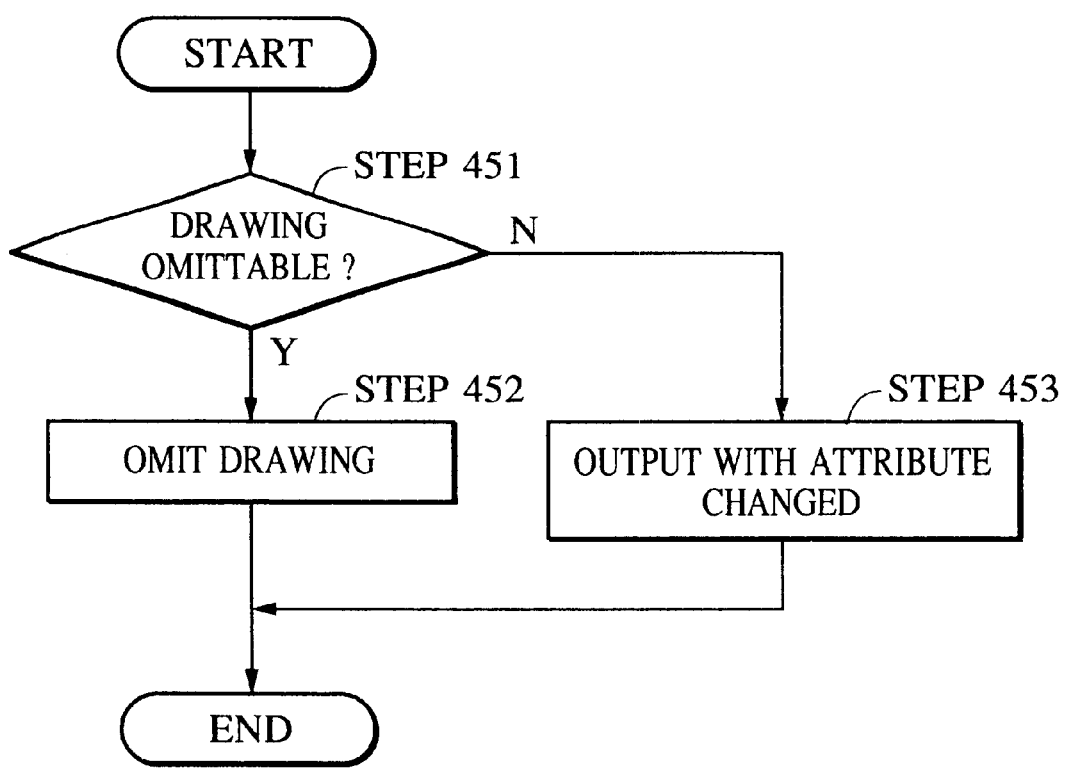
FIG. 6 is a flowchart describing the processing of Step 410 in FIG. 5 in detail.

FIG. 6 is a flowchart describing the processing of Step 410 in FIG. 5 in detail.

Figures 7, 8:
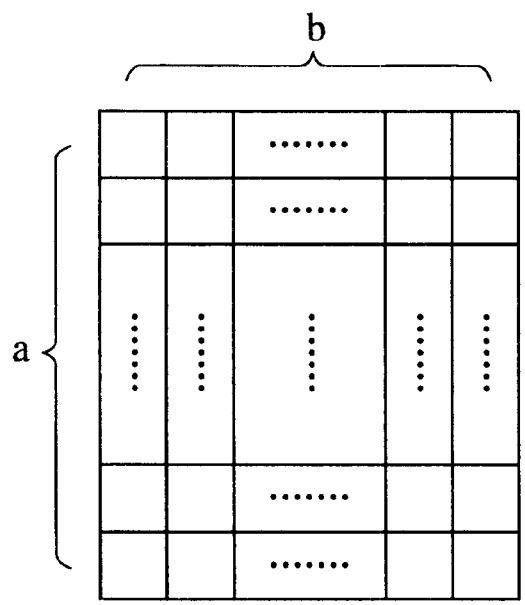
FIG. 7 is a diagram illustrating the area information stored in Step 411 in FIG. 5.
FIG. 8 is an example illustrating an example of performing division for each area in the event that a plurality of drawing areas are to be stored.

FIG. 7 is a diagram illustrating the data of the area information stored in the "step for saving drawing area to area information [i]" (Step 411) in FIG. 5.

The programs illustrated in FIGS. 3, 4, 5, and 6 are stored in the HD 12 or FD 14 of the host computer 3000 as a module containing the logic drawing automation program, and functions as achieving means by the CPU 1 being executed under the operating system 46.

Now, an embodiment of the present invention is described in detail, with reference mainly to FIGS. 3, 4, 5 and 6.

The embodiment of the present invention operates by means of the CPU 1 executing the BIOS, operating system, applications, and logic drawing automation program according to the present invention. The BIOS is written to the program ROM 3 and the operating system is written to a hard disk 12 (hereafter referred to HD 12) which is external storage. When the electric power to the host computer 3000 is turned on, the IPL (Initial Program Loading) function in the BIOS program causes the operating system to be read from the HD to the RAM 2, an the operating system is initiated.

Next, the point at which the printing-related module including the logic drawing automatic control program becomes operable is the point at which applications operating under the operating system execute printing processing on the host computer 3000 from instruction by the user, this being the time at which the printing-related module is read from a FD 14 storing the printing-related module and set in the FDD 13, or from a HD drive 12 storing the printing-related module, and loaded to the RAM 2. As described above, FIG. 2 illustrates a memory map wherein the control module is loaded on the RAM 2 based on administration of the operating system in the host computer 3000 and is in an executable state. The overall processing flow is as described in FIG. 3, and is comprised of a step (Step 201) for generating output data from printing data received from applications at the time of executing printing. More specifically, as shown in FIG. 4, first, the variable "i" which represents the number of saved areas is set to 0 (Step 301). Next, drawing processing is accepted from the application (Step 302), and judgment is made whether or not it is a drawing completion request (Step 303). In the event that the accepted drawing processing comprises drawing completion, the processing is completed. In the event that the accepted drawing processing does not comprise drawing completion, judgment is made whether or not it is a page break request (Step 304). In the event that the accepted drawing processing comprises a page break request, the variable "i" is set to 0 (Step 305), and the flow returns to Step 302. In all other cases, area management and output is performed (Step 306). Next, the variable "i" is incremented by 1 (Step 307), and the flow returns to the process of accepting the next drawing processing (Step 302). Subsequently, the series of Steps 302 through 307 are repeated until a drawing completing request is received from the application. The details of the processing of Step 306 are as shown in FIG. 5, and first, judgment is made whether or not there is need to perform changed output (Step 401). Here, judgment that there is no such need comprises cases where the drawing attribute is overwriting and there is no need to change, and cases where the user selects a mode in which the drawing attributes are not changed. In the event that there is no need, the flow proceeds to Step 409. In the event that there is a need, the variable "flag" is set to 0 (Step 402). Next, the variable "j" is set to 0 (Step 403). Next, judgment is made whether or not "j" is less than "i" (Step 404). In the event that "j" is not less than "i", the flow proceeds to Step 408. In the event that "j" is less than "i", judgment is made whether or not there is overlapping between the drawing area of the drawing request received from the application and the No. j area information (hereafter described as area information [j]) (Step 405). In the event that there is overlapping, the variable "flag" is set to 1 (Step 407), and the flow proceeds to Step 408. In the event that there is no overlapping, the variable "j" is incremented by 1, and the flow returns to Step 404. Subsequently, the processing between Step 404 and Step 406 is repeated, and the flow proceeds to Step 408 according to conditions in Step 404 or Step 405. In Step 408, judgment is made whether or not the variable "flag" is 0. In the event that this is 0, the area of the drawing request received from the application does not overlap what has already been drawn, so the relevant area is white. Accordingly, the logic drawing requested by the application can be replaced with equal processing restricted to the case in which the relevant area is white. This changed output is Step 410. The flow then proceeds to Step 411. The detailed process of Step 410 is as shown in FIG. 6, wherein judgment is made whether or not drawing can be omitted (Step 451). In the event that drawing can be omitted, drawing is omitted (Step 452), and the flow ends. In the event that drawing cannot be omitted, output is performed with changed attributes (Step 453).

The following are examples of changed attributes.
Example wherein representation is made with concentration:
  Binary representation, with white=0 and black=1;
  256 gradient grayscale representation, with white=0 and black=255, etc.

TABLE 1

| Original drawing attributes | Changed drawing attributes |
|---|---|
| OR drawing | Overwriting drawing |
| AND drawing | Drawing omitted |
| XOR | Overwriting drawing |

Example wherein representation is made with brightness:
  Binary representation, with white=1 and black=0;
  256 gradient grayscale representation, with white=255 and black=0;
  RGB representation wherein red=(255, 0, 0), green=(0, 255, 0), blue=(0, 0, 255), white=(255, 255, 255), and black (0, 0, 0), etc.

TABLE 2

| Original drawing attributes | Changed drawing attributes | Changed color attributes |
|---|---|---|
| OR drawing | No drawing necessary | No change |
| AND drawing | Drawing omitted | No change |
| XOR | Overwriting | Original color inverted (XOR of original color and white) |

Example of raster operation code in Windows:

TABLE 3

| Original drawing attributes | Changed drawing attributes |
|---|---|
| DSo | D (No drawing necessary) |
| DSa | S |
| DSx | DSn |
| DPa | P |

Here, D represents "destination", S is for "source", o for OR drawing, a for AND drawing, x for XOR, and n for NOT. Incidentally, DSo is a code for OR drawing of the destination and source, and is replaced with a drawing attribute D (No drawing necessary).

In the event that the variable "flag" is not 0, the relevant area has already been drawn. Accordingly, output is performed without change, in order to prevent changing the final drawing output (Step 409). Next, the flow proceeds to Step 411. In Step 411, the drawing area of the drawing request received from the application is saved. FIG. 7 shows how this area information is saved.

The embodiment of the present invention described above thus realizes heretofore-unachieved reduction of generation of defective printing owing to a portion of the logic drawing being enabled, prevention of increased output data amount accompanying switching of the logic drawing attributes, improved printing throughput with the output device such as a printer, and improved reproducability with the output device such as a printer.

Also, while the medium for storing the printing-related module including the logic drawing output processing program has been described as being a FD or HD drive, the medium need not be restricted to such; rather, the medium may comprise a CD-ROM, IC memory card, or such which is carried out via e-mail or computer communications. Further, the printing-related module including the logic drawing output processing program may be recorded in the ROM 3, so that this forms part of the memory map, thereby being directly executed by the CPU 1.

Other Embodiments

Though storage of areas have been described as being performed individually in the above embodiment, the present embodiment of the invention refers to dividing the storage into a plurality of areas and thus carrying out.

Figure 9:
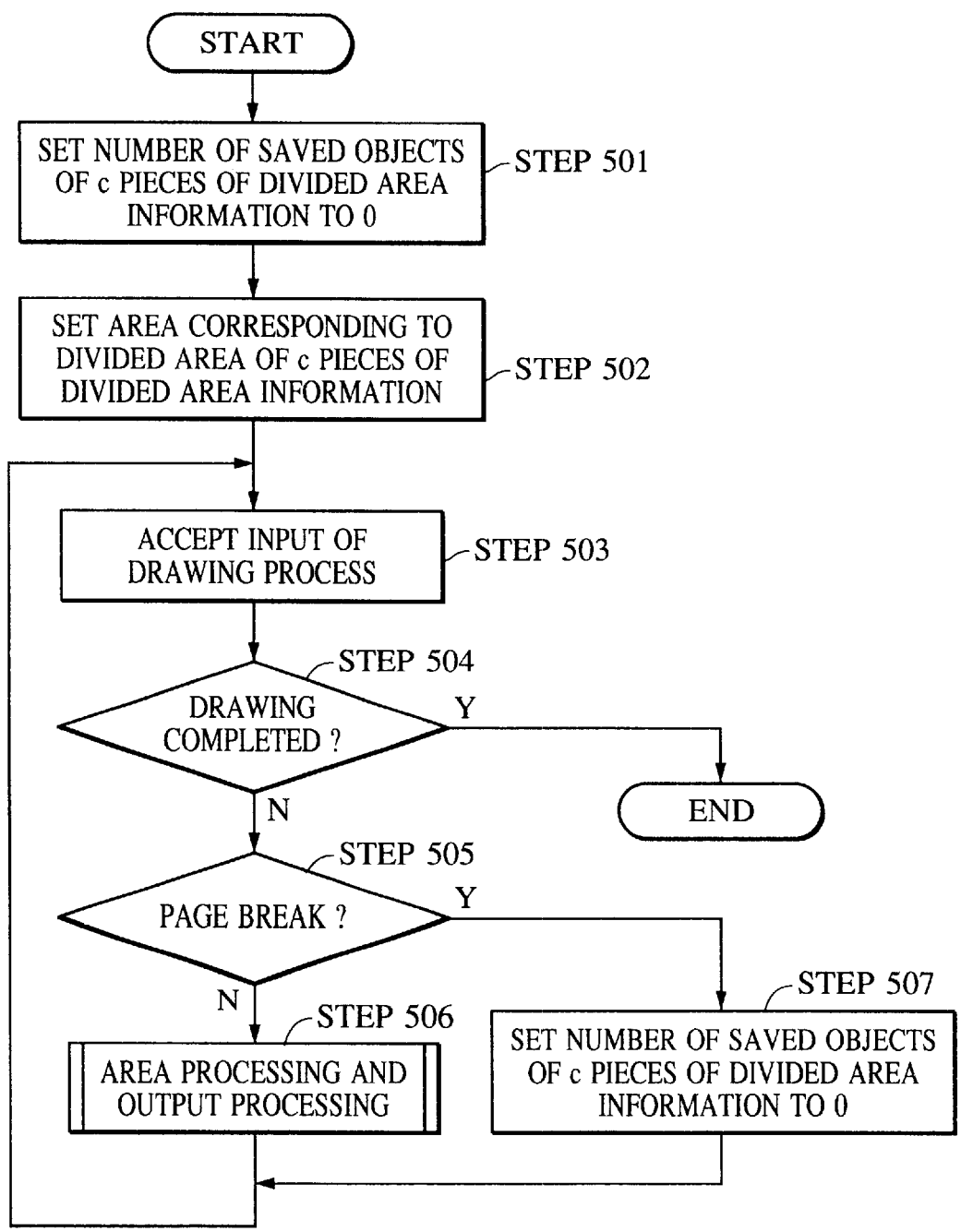
FIG. 9 is a flowchart describing the processing of Step 201 in FIG. 3 in detail.
Figure 10A:
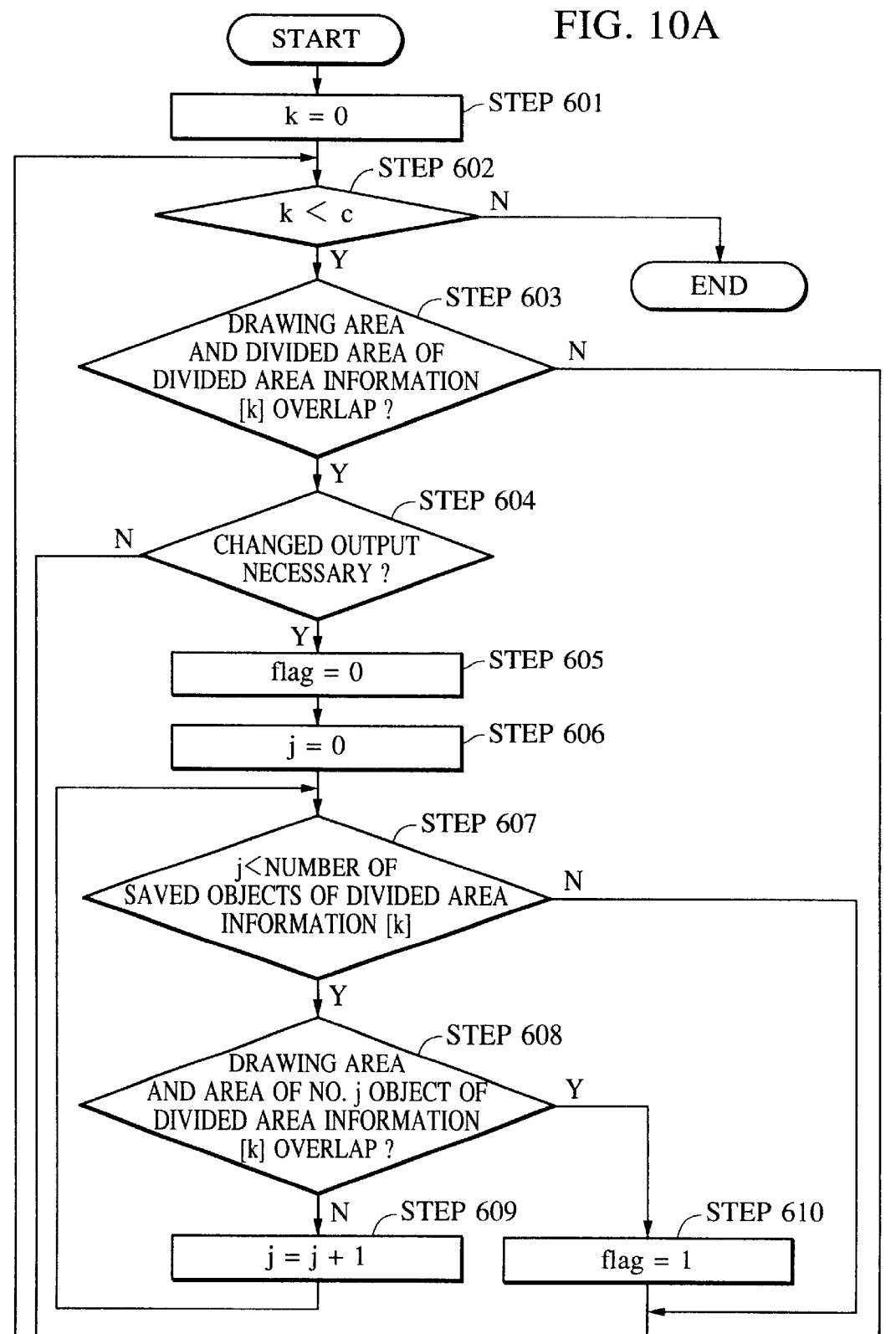

FIGS. 9 and 10 are in fact FIGS. 4 and 5 shown with the preceding embodiment, changed in accordance with the present embodiment.

Also, regarding the multiple area storage according to the present embodiment, FIG. 8 provides reference for the area storage division. FIG. 8 illustrates one page being divided in an "a" number of equal parts in the vertical direction and a "b" number of equal parts in the horizontal direction, thus dividing the page into the resultant "c" (=a×b) number of areas. In the present embodiment, an example is shown wherein a drawing area is stored to each of the divided areas.

FIG. 9 is a flowchart describing the output data generation step (Step 201) in FIG. 3 in detail, the drawing area being divided into a plurality.

FIG. 10 is a flowchart describing the area processing and output processing step (Step 506) in FIG. 9 in detail.

Figure 11:
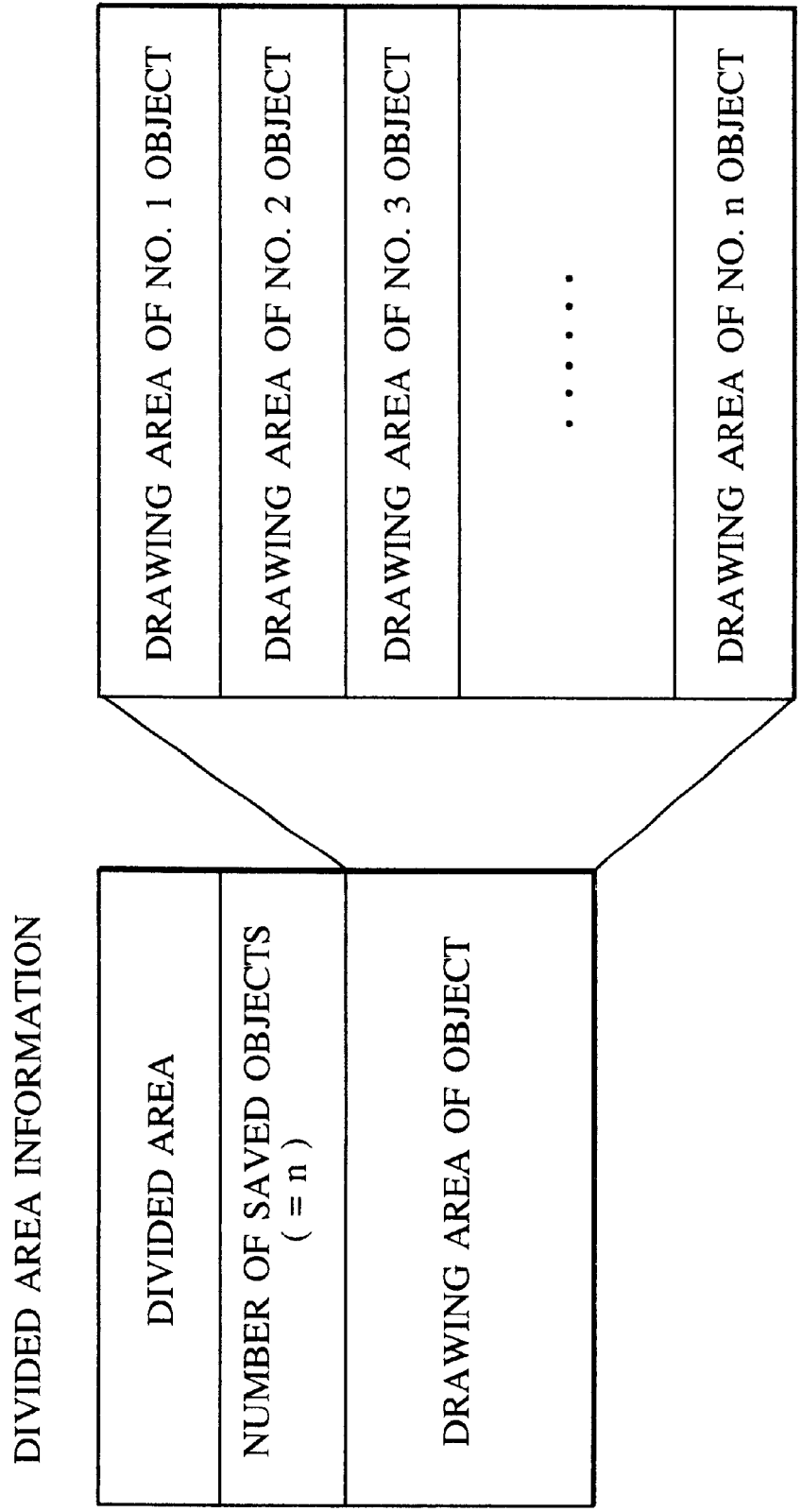
FIG. 11 is a diagram illustrating the contents of the divided area information to be stored in Step 614 of FIG. 9.

FIG. 11 is a data configuration for saving information corresponding to the divided areas in the above-described FIG. 8 (hereafter referred to as divided area information). This includes division area for storing corresponding divided areas, the number of saved objects which indicates the number of objects drawn within the area, and the areas for the objects drawn so far.

FIG. 12 is a diagram illustrating the divided area information shown in FIG. 11 to be saved according to the number (=c) into which it is divided. The No. "i" divided area information is described as "divided area information [i]".

Figure 13:
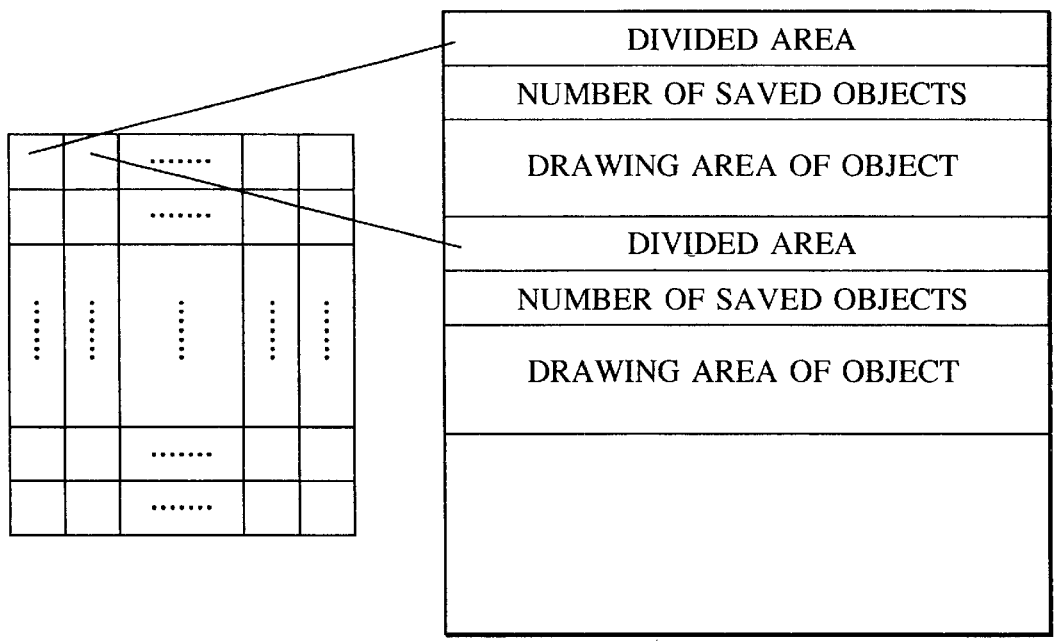
FIG. 13 is a diagram illustrating the correlation of which area is contained in the respective division areas of divided area information, in Step 502 of FIG. 9.

FIG. 13 is a diagram illustrating the correlation of which area is contained in the respective "c" number of division areas included divided area information.

Figure 14:
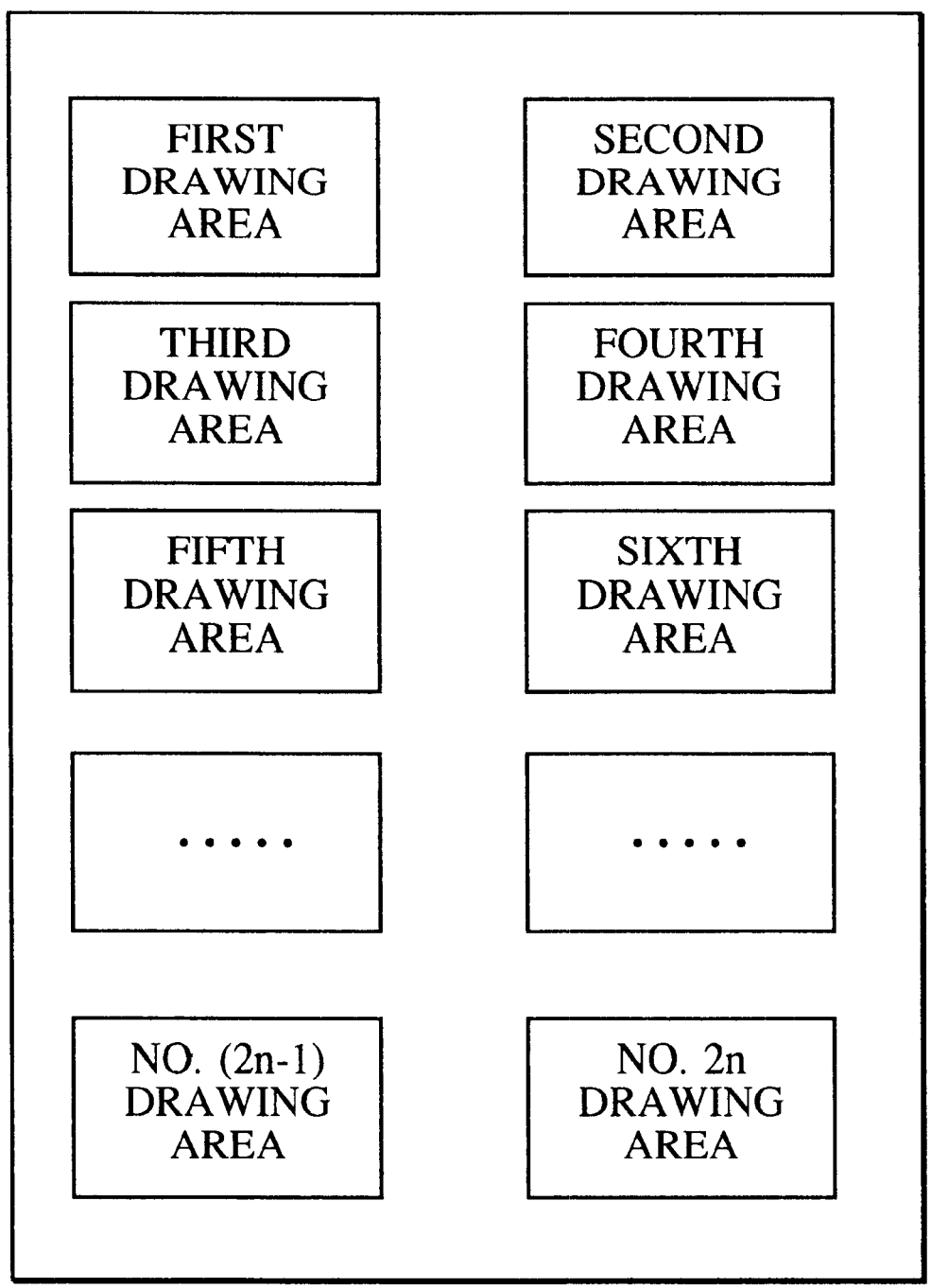
FIG. 14 is a diagram illustrating drawing in the example.

FIG. 14 is a diagram illustrating drawing in the example, and is sued in description of the present embodiment.

Figure 15:
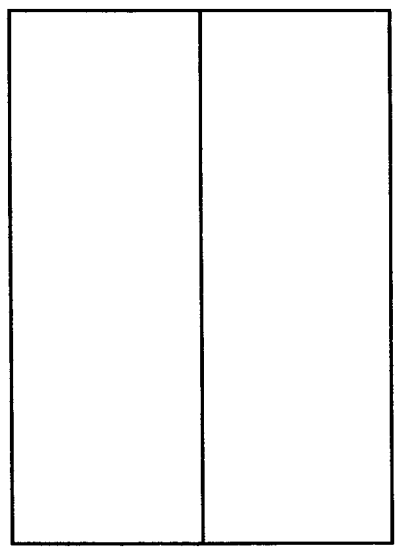
FIG. 15 is a diagram illustrating division in the case that an example of a plurality of drawing areas being stored, this being equivalent to a=1, =2 in FIG. 8.

FIG. 15 is an example of the above-described FIG. 8 wherein a=1, b=2.

The following is a detailed description of the present embodiment, mainly with reference to FIGS. 3, 9, and 10.

The present embodiment of the present invention consists of the cases in the above-described FIG. 3 in which Step 201 is such as shown in FIG. 9. First, the "c" number of saved objects of the divided area information is set to 0 (Step 501). Next, as shown in FIG. 13, division area of "c" pieces of divided area information is set (Step 502). Next, drawing processing is accepted from the application (Step 503), and judgment is made whether or not it is a drawing completion request (Step 504). In the event that the accepted drawing processing comprises drawing completion, the processing is completed. In the event that the accepted drawing processing does not comprise drawing completion, judgment is made whether or not it is a page break request (Step 505). In the event that the accepted drawing processing comprises a page break request, the "c" number of saved objects of the divided area information is set to 0 as in Step 501 (Step 507). In the event that the accepted drawing processing does not comprise a page break request, area management and output is performed (Step 506). Next, the flow returns to the process of accepting the next drawing processing (Step 503). Subsequently, the series of Steps 503 through 507 is repeated until a drawing completing request is received from the application. The details of the processing of Step 506 are as shown in FIG. 10, and first, variable "k" is set to 0 (Step 601). Next, judgment is made whether or not "k" is less than the number of divided areas "c" (Step 602). In the event that "k" is not smaller than "c", the flow ends. In the event that "k" is smaller than "c", the flow proceeds to Step 603. In Step 603, judgment is made whether or not there is overlapping between the drawing area and the divided area of the divided area information [k]. In the event that there is no overlapping, the flow proceeds to Step 616. In the event that there is overlapping, judgment is made whether or not there is need to perform changed output (Step 604). In the event that there is no such need, the flow proceeds to Step 613. In the event that there is such need, the variable "flag" is set to 0 (Step 605). Next, the variable "j" is set to 0 (Step 606). Next, comparison is made between "j" and the number of saved objects of the divided area information [k] (Step 607). In the event that "j" is not smaller than [k], the flow proceeds to Step 611. In the event that "j" is smaller than [k], the flow proceeds to Step 608. In Step 608, judgment is made whether or not there is overlapping between the drawing area of the drawing request received from the application and the No. j area information of the divided area information [k]. In the event that there is no overlapping, "j" is incremented by 1 (Step 609), and the flow returns to Step 607. In the event that there is overlapping, the flow proceeds to Step 610, and the variable "flag" is incremented by 1. Next, judgment is made whether or not the variable "flag" is 0 (Step 611). In the event that the variable "flag" is 0, changed output is performed (Step 612). The flow then proceeds to Step 614. The detailed process of Step 612 is as shown in FIG. 6. In the event that the variable "flag" is not 0, unchanged output is performed (Step 613), and the flow then proceeds to Step 614. In Step 614, the number of saved objects of the divided area information (represented by "m") is incremented by 1. Next, the drawing area is saved as the No. m object of the divided area information [k] (Step 615). Next, the flow proceeds to Step 616, increments "k" by 1, and returns to Step 602. Subsequently, the series of steps from Step 602 to Step 616 is performed until completing under the conditions of Step 602.

Now, a supplementary description is made regarding the specific example of the embodiment according to the present invention shown in FIG. 14.

Here, judgment of whether or not two areas are overlapping takes a markedly longer time as compared to other processing. Also, division of the area is performed as shown in FIG. 15.

In the case of integrating area storage, judgment of whether or not two areas are overlapping (Step 405) must be made up to (2n−1) times, in the case that the drawing object is No. 2n.

In the event of creating dual drawing storage, judgment of whether or not two areas are overlapping (Steps 603 and 608) must be made 2+(n−1) times.

Since the total number of times of judgment equals the number of times of judgment for the first object+the number of times of judgment for the second object+ . . . and so on through the number of times of judgment for the No. 2n object, the number of times can be reduced in the event that n is large, by setting area storage to two rather than one.

In this case, the processing time is dependent on the number of times of making judgment, so the processing can be performed at much higher speed by dividing the area storage into a plurality of areas (i.e., two).

With the embodiment according to the present invention, the paper size is shown to be the same for each page, but the present invention operates in the same manner even in cases in which the page size changes.

According to the above-described embodiment of the invention, processing speed in cases in which the number of times of drawing requests is large can be improved.

Also, the embodiment according to the present intention refers to representing with rectangular forms the area information saved as the area information in FIG. 7 or the object drawing area in FIG. 11, in the above two embodiments of the invention.

Figure 16:
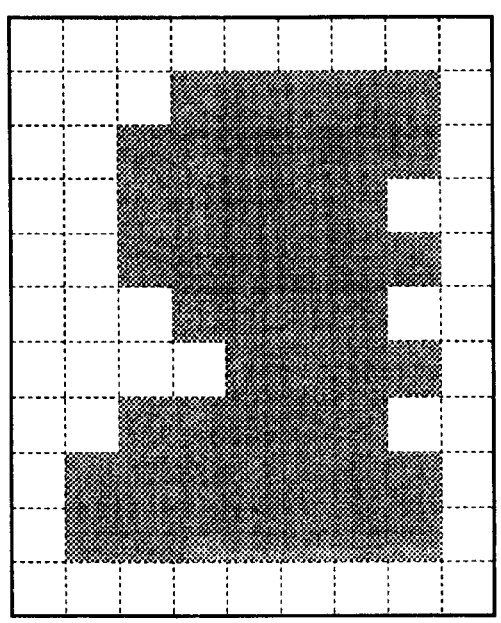
FIG. 16 is an example of drawing.
Figure 17:
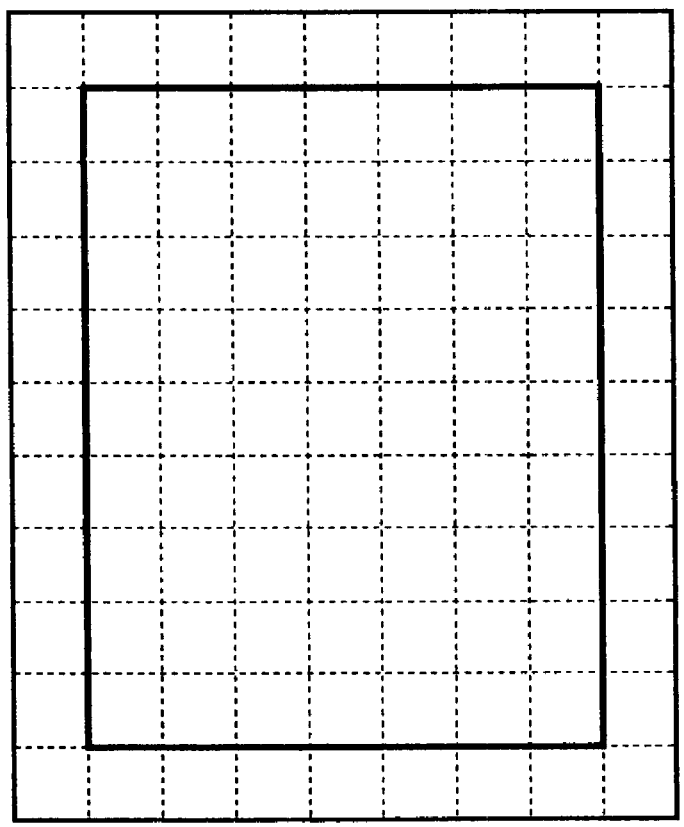
FIG. 17 is an example of performing saving of the drawing area with rectangles.

This means that saving drawing area such as shown in FIG. 16 is performed such that the information is saved in rectangular form of a size regarding which there can be none any smaller, an example of which is shown in FIG. 17. In the case of saving using forms other than rectangular, saving must be performed according to the coordinates of each apex in FIG. 16, or in an image format wherein 1 indicates that a corresponding pixel is within the area and 0 represents otherwise. In such cases, storage area is markedly consumed in the event that the image area is large and complex. Also, this takes more time for making judgment in the event that two areas are overlapping.

As described above, storage can be performed efficiently and processing speed can be improved, by means of saving the areas in rectangular form, as shown in FIG. 17.

As described above, the present invention is advantageous in realizing heretofore-unachieved reduction of generation of defective printing owing to a portion of logic drawing being enabled, prevention of an increased output data amount accompanying switching of the logic drawing attributes, improved printing throughput with the output device such as a printer, and improved reproducability with the output device such as a printer.

Also, the present invention is advantageous in improving processing speed in the case that the number of drawing requests becomes large.

Also, the present invention is advantageous in simplifying processing and improving processing speed. Further, the present invention is advantageous in performing storage efficiently and improving processing speed.

What is claimed is:

1. An information processing apparatus, comprising:
   input means for inputting drawing commands;
   first judging means for judging whether or not it is necessary to change the drawing attributes of a drawing command input by said input means;
   second judging means for judging whether or not a drawing area of the drawing command input by said input means overlaps with a drawing area of another drawing command, in the event that said first judging means judges that it is necessary to change the drawing attributes by said first judging means; and
   changing means for not changing the drawing attributes of the drawing command input by said input means in the event that said first judging means judges that it is not necessary to change the drawing attributes of the drawing command input by said input means or in the event that said second judging means judges the respective drawing areas to be overlapping, and for changing the drawing attributes of the drawing command input by said input means in the event that said second judging means judges the respective drawing areas not to be overlapping.

2. An information processing apparatus according to claim 1, further comprising output means for outputting to a printer the drawing command changed by said changing means.

3. An information processing apparatus according to claim 1, wherein said changing means performs changing of the type of drawing, or omits drawing.

4. An information processing apparatus according to claim 1, wherein said changing means changes OR drawing to overwriting drawing, omits AND drawing, and changes XOR drawing to overwriting drawing.

5. An information processing apparatus according to claim 1, wherein said changing means omits OR drawing, changes AND drawing to overwriting drawing, changes XOR drawing to overwriting drawing, and inverts the color attributes.

6. An information processing apparatus according to claim 1, wherein judging by said first and second judging means and changing by said changing means are not performed in the event that the drawing command input by said input means consists of overwriting drawing.

7. An information processing apparatus according to claim 1, further comprising specifying means for specifying whether or not to perform judging by said first and second judging means and changing by said changing means.

8. An information processing apparatus according to claim 1, wherein the drawing area is divided into rectangular blocks for judging by said first and second judging means.

9. An information processing method, comprising the following steps:
   an input step of inputting drawing commands;
   a first judging step of judging whether or not it is necessary to change the drawing attributes of a drawing command input in said input step;
   a second judging step of judging whether or not a drawing area of the drawing command input in said input step overlaps with a drawing area of another drawing command, in the event that said first judging step judges that it is necessary to change the drawing attributes by said first judging step; and
   a changing step of not changing the drawing attributes of the drawing command input in said input step in the event that said first judging step judges that it is not necessary to change the drawing attributes of the drawing command input in said input step or in the event that said second judging step judges the respective drawing areas to be overlapping, and for changing the drawing attributes of the drawing command input in said input step in the event that said second judging step judges the respective drawing areas not to be overlapping.

10. An information processing method according to claim 9, further comprising an output step of outputting the drawing command changed by said changing step to a printer.

11. An information processing method according to claim 9, wherein said changing step performs changing of the type of drawing, or omits drawing.

12. An information processing method according to claim 9, wherein said changing step changes OR drawing to overwriting drawing, omits AND drawing, and changes XOR drawing to overwriting drawing.

13. An information processing method according to claim 9, wherein said changing step omits OR drawing, changes AND drawing to overwriting drawing, changes XOR drawing to overwriting drawing, and inverts the color attributes.

14. An information processing method according to claim 9, wherein judging by said first and second judging steps and changing by said changing step are not performed in the event that the drawing command input by said input step consists of overwriting drawing.

15. An information processing method according to claim 9, further comprising a specifying step of specifying whether or not to perform judging by said first and second judging steps and changing by said changing step.

16. An information processing method according to claim 9, wherein the drawing area is divided into rectangular blocks for a judging by said first and second judging steps.

17. A computer-readable storage medium, storing a program for executing the following steps:

an input step of inputting drawing commands;

a first judging step of judging whether or not it is necessary to change the drawing attributes of a drawing command input in said input step;

a second judging step of judging whether or not a drawing area of the drawing command input in said input step overlaps with a drawing area of another drawing command, in the event that said first judging step judges that it is necessary to change the drawing attributes by said first judging step; and a changing means step of not changing the drawing attributes of the drawing command input in said input step in the event that said first judging step judges that it is not necessary to change the drawing attributes of the drawing command input in said input step or in the event that said second judging step judges the respective drawing areas to be overlapping, and for changing the drawing attributes of the drawing command input in said input step in the event that said second judging step judges the respective drawing areas not to be overlapping.

18. The storage medium according to claim 17, further comprising an output step of outputting the drawing command changed by said changing step to a printer.

19. The storage medium according to claim 17, wherein said changing step performs changing of the type of drawing, or omits drawing.

20. The storage medium according to claim 17, wherein said changing step changes OR drawing to overwriting drawing, omits AND drawing, and changes XOR drawing to overwriting drawing.

21. The storage medium according to claim 17, wherein said changing step omits OR drawing, changes AND drawing to overwriting drawing, changes XOR drawing to overwriting drawing, and inverts the color attributes.

22. The storage medium according to claim 17, wherein judging by said first and second judging steps and changing by said changing step are not performed in the event that the drawing command input by said input step consists of overwriting drawing.

23. The storage medium according to claim 17, further comprising a specifying step of specifying whether or not to perform judging by said first and second judging steps, and changing by said changing step.

24. The storage medium according to claim 17, wherein the drawing area is divided for judging by said first and second judging steps.

25. The storage medium according to claim 17, wherein said program is a printer driver program.

26. A printing system having a printer and an information processing apparatus, said information processing apparatus comprising:

input means for inputting drawing commands;

first judging means for judging whether or not it is necessary to change the drawing attributes of a drawing command input by said input means;

second judging means for judging whether or not a drawing area of the drawing command input by said input means overlaps with a drawing area of another drawing command, in the event that said first judging means judges that it is necessary to change the drawing attributes by said first judging means; and changing means for not changing the drawing attributes of the drawing command input by said input means in the event that said first judging means judges that it is not necessary to change the drawing attributes of the drawing command input by said input means or in the event that said second judging means judges the respective drawing areas to be overlapping, and for changing the drawing attributes of the drawing command input by said input means in the event that said second judging means judges the respective drawing areas not to be overlapping; and output means for outputting the drawing commands changed by said changing means to the printer.

* * * * *

UNITED STATES PATENT AND TRADEMARK OFFICE
CERTIFICATE OF CORRECTION

PATENT NO. : 6,281,982 B1
DATED : August 28, 2001
INVENTOR(S) : Kenji Nagoya

It is certified that error appears in the above-identified patent and that said Letters Patent is hereby corrected as shown below:

<u>Column 3,</u>
Line 7, "=2" should read -- b=2 --.

<u>Column 4,</u>
Line 11, "the" should read -- and --; and
Line 19, "externals" should read -- external --.

<u>Column 7,</u>
Line 48, "sued" should read -- used --.

<u>Column 11,</u>
Line 31, "means" should be deleted.

Signed and Sealed this

Second Day of April, 2002

Attest:

JAMES E. ROGAN
*Attesting Officer*  *Director of the United States Patent and Trademark Office*